United States Patent

Clark

[15] 3,670,857

[45] June 20, 1972

[54] INTERNAL RESISTANCE FLUID CLUTCH

[72] Inventor: Marion Clark, 546 West Pleasant, Tulare, Calif. 93274

[22] Filed: Oct. 28, 1970

[21] Appl. No.: 84,804

[52] U.S. Cl. .............................................. 192/60, 74/792
[51] Int. Cl. ........................................................ F16d 31/02
[58] Field of Search ..................................... 192/60 R, 58 R

[56] References Cited

UNITED STATES PATENTS

| | | | |
|---|---|---|---|
| 2,086,519 | 7/1937 | Barnes | 192/60 |
| 2,243,652 | 5/1941 | Reed | 192/60 |
| 2,670,827 | 3/1954 | Sanders | 192/60 |
| 2,798,580 | 7/1957 | Lenz | 192/60 |

*Primary Examiner*—Benjamin W. Wyche
*Assistant Examiner*—Randall Heald
*Attorney*—Carl R. Brown

[57] ABSTRACT

A transmission in which the input and output shafts are coupled by a fluid drive which is pressurized by eccentrically driven pumps, the variable speed fluid coupling being effective until a particular rotational speed is reached, at which speed the drive is positively locked. Means is also provided for locking the driven selectively at any speed. The transmission can be shifted between forward and reverse positions, and the shift mechanism incorporates braking means to facilitate gear engagement, and locking means operable in a stopped position, the arrangement being particularly adaptable to automotive vehicles.

4 Claims, 9 Drawing Figures

INVENTOR.
MARION A. CLARK

BY

*Carl R. Brown*

ATTORNEY

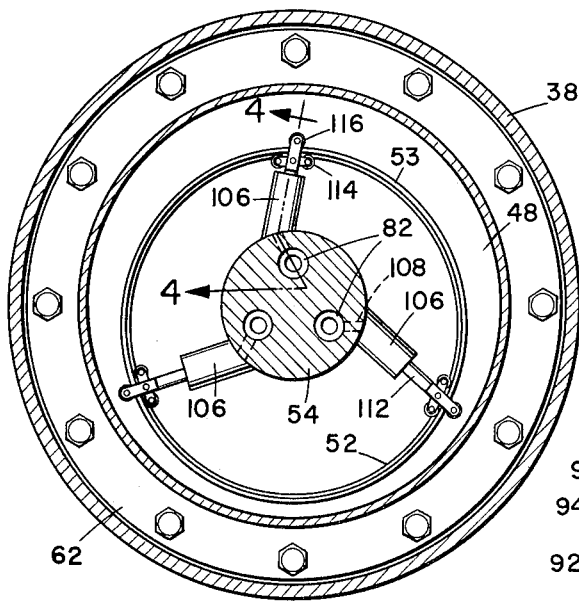
Fig. 3
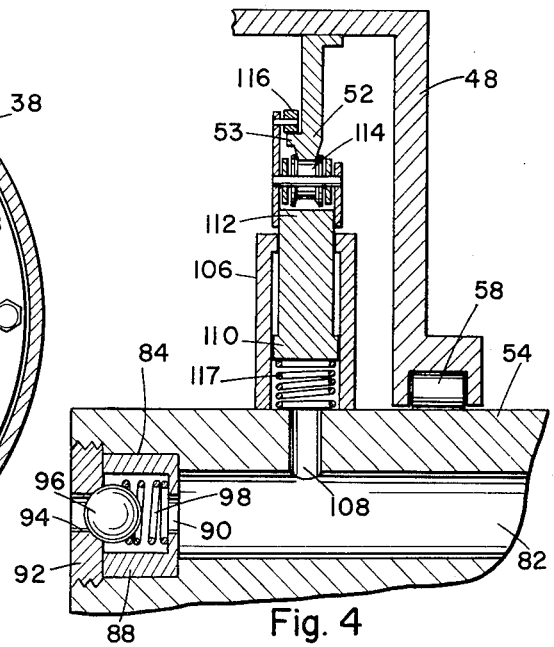
Fig. 4
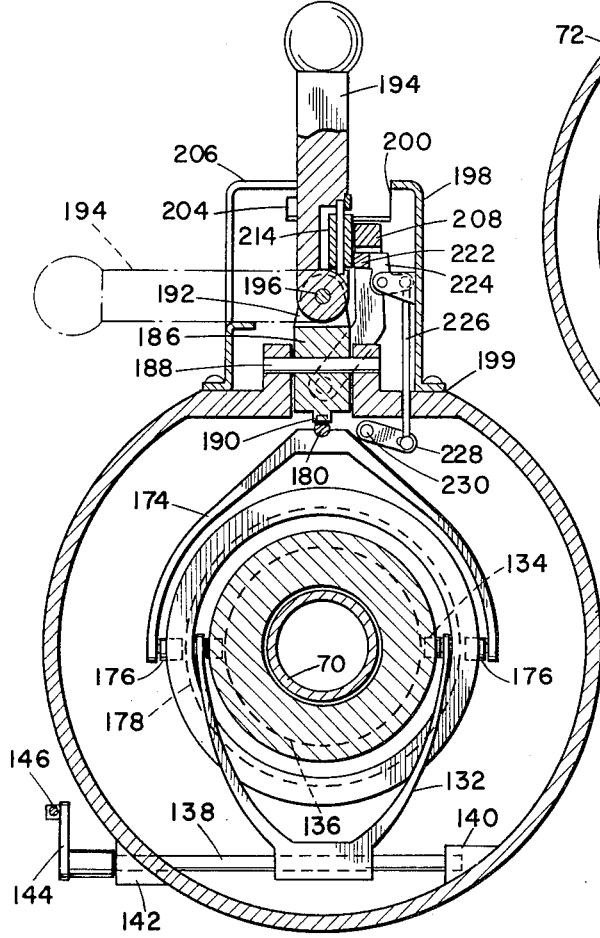
Fig. 6
Fig. 5
INVENTOR.
MARION A. CLARK
BY
*Carl R. Brown*
ATTORNEY INVENTOR.
MARION A. CLARK
BY
Carl R. Brown
ATTORNEY

INTERNAL RESISTANCE FLUID CLUTCH

BACKGROUND OF THE INVENTION

Vehicle transmissions of the automatic or semi-automatic type are usually complex mechanisms involving turbines for fluid drive coupling, multiple stage gears and speed responsive shifting means to control the gear ratios. Such mechanisms are costly, since many precision parts are used, and servicing is difficult.

SUMMARY OF THE INVENTION

The transmission described herein is a simple mechanism in which the input and output shafts are coupled by fluid pressure means actuated by eccentrically driven pumps. At low speeds, the drive coupling is proportional to the resistance of the fluid through a metered flow path and, at a predetermined rotational speed, a speed responsive valve element shuts off the fluid flow and locks the drive in positive engagement. An auxiliary control permits locking of the drive at any speed when power is required. Gears are provided for forward and reverse drive, the shift mechanism incorporated a brake to retard the rotating mechanism and facilitate gear engagement, and a lock to hold the output shaft secure in a stopped or parked position. The transmission is readily adaptable to automotive vehicles with conventional engines.

The primary object of this invention, therefore, is to provide a new and novel transmission.

Another object of this invention is to provide a new and improved transmission having a pumped fluid drive coupling effective to a predetermined speed, at which the fluid coupling becomes locked in positive drive.

Another object of this invention is to provide a new and improved transmission having a simple gear shift mechanism for forward and reverse selection.

A further object of this invention is to provide a new and improved transmission in which a locking mechanism is incorporated in the gear shift.

Other objects and many advantages of this invention will become more apparent upon a reading of the following detailed description and an examination of the drawings, wherein like reference numerals designate like parts throughout.

BRIEF DESCRIPTION OF THE DRAWINGS

FIG. 3 is a sectional view taken on line 3—3 of FIG. 1.
FIG. 4 is an enlarged sectional view taken on line 4—4 of FIG. 3.
FIG. 5 is a sectional view taken on line 5—5 of FIG. 1.
FIG. 6 is a sectional view taken on line 6—6 of FIG. 1.

DESCRIPTION OF THE PREFERRED EMBODIMENT

Figure 1:
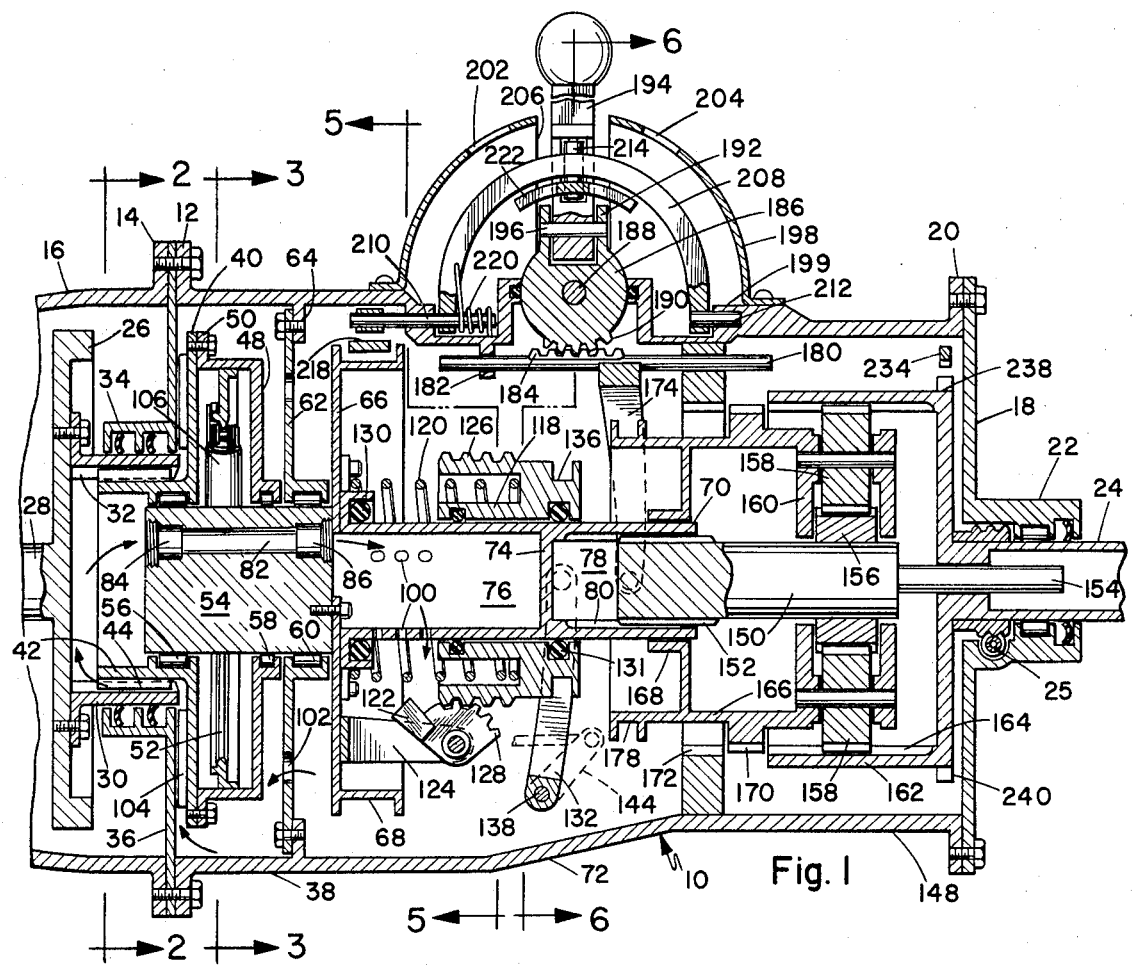
FIG. 1 is a vertical axial sectional view of the transmission.

The transmission is contained in a generally cylindrical housing 10 having a front annular flange 12, which is secured to the existing rear flange 14 of an engine flywheel housing 16. At the rear end of housing 10 is an end plate 18 secured to a rear annular flange 20 on the housing, the end plate having an axial bearing hub 22 in which the output shaft 24 is journalled. A conventional worm type take-off drive 25 for the speedometer is incorporated in the bearing hub 22. The existing flywheel 26, fixed to input shaft 28, has a rearwardly extending cylindrical sleeve 30 fixed thereto, the sleeve having internal splines 32. Sleeve 30 rotates in a bearing seal 34 supported on a web plate 36, which is held between flanges 12 and 14 and separates the flywheel housing from the interior of the transmission housing. It should be noted that the various bearings and seals in the unit are shown in simple form and may be of any suitable conventional type.

Figure 2:
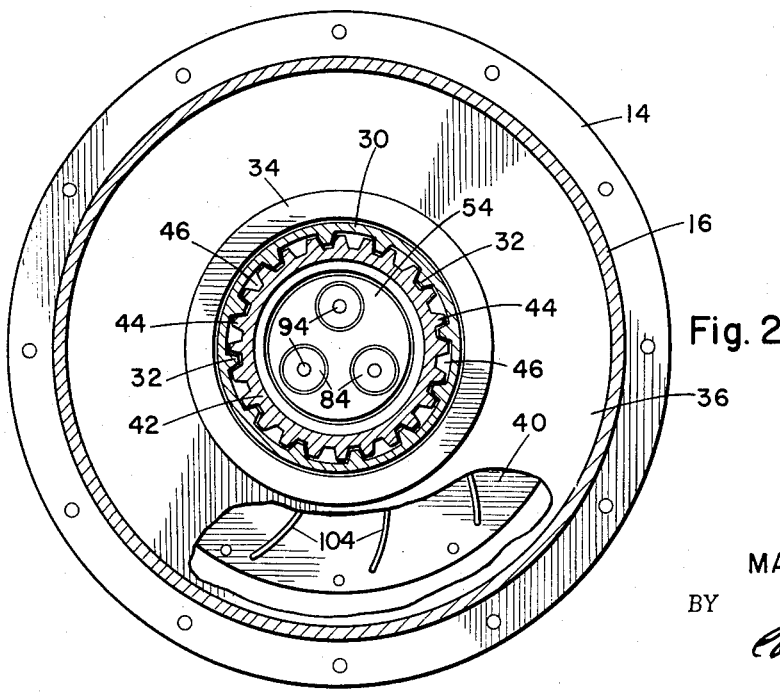
FIG. 2 is a sectional view taken on line 2—2 of FIG. 1.

In the forward portion 38 of housing 10 is a drive disc 40 having a central boss 42 with external splines 44, which engage with splines 32 in driving connection. With reference to FIG. 2, there are only half as many splines 32 as there are splines 44, so that axially extending channels 46 are left open between alternate pairs of splines 44. Axially spaced from drive disc 40 is a cam disc 48, having an annular flange 50 which is peripherally secured to the drive disc. Fixed to flange 50 is a radially inwardly extending eccentric cam ring 52, having a forwardly projecting rail 53. Extending axially through the boss 42 and cam disc 48 is a cylindrical valve block 54, rotatably held in bearings 56 and 58 in the boss and cam disc, respectively. The rear end of valve block 54 is further supported in a fixed bearing 60 on a baffle plate 62, secured to an internal flange 64 in the forward housing position 38.

Fixed to the rear of valve block 54 is a brake drum 66 having an annular channel 68, and fixed to the rear face of the brake drum is a coupling shaft 70, extending axially through the central portion 72 of housing 10. Coupling shaft 70 is hollow and is divided by a wall 74 into a front chamber 76 and a rear chamber 78, the latter having internal splines 80. Valve block 54 has a plurality of equally spaced, axially extending passages 82, three being shown as an example. In the forward end of each passage 82 is an inlet valve 84, and in the rear end of each is an outlet valve 86, the outlet valves opening into the front chamber 76. A typical inlet valve 84 is shown in FIG. 4, in which a valve body 88 with an outlet port 90 is held in place by a threaded end cap 92, the end cap having an inlet port 94 normally closed by a ball 96, which is held by a spring 98. The outlet valves 86 are similar but with the ball and spring reversed to allow rearward fluid passage only. Coupling shaft 70 has metering ports 100 opening outwardly from front chamber 76, so that oil can pass into the central housing portion 72. The oil path, indicated by directional arrows in FIG. 1, is from the interior of boss 42 at the forward end of the valve block 54, through the valves into front chamber 76 and out through ports 100. The oil returns through openings 102 in baffle plate 62 and is delivered to the interior of boss 42 through channels 46. To assist the return flow, the front face of drive disc 40 carries vanes 104, which pull the oil radially inwardly.

Oil is forced through the valve block 54 by pumps 106 secured on the valve block, each pump communicating by a port 108 to one passage 82. Each pump has a piston 110 with an outwardly extending stem 112, at the outer end of which are cam following inner rollers 114 riding inside cam ring 52, and an outer roller 116 riding on the outside of rail 53 as in FIG. 4. This provides a positive push-pull drive and a spring 117 biases the piston 110 outwardly to prevent chattering of the rollers. The pumps are inclined from radial positions against the direction of relative rotation of the cam ring, as shown in FIG. 3, in order to minimize bending loads on the pumps. Each outward stroke of piston 110 draws oil through inlet valve 84 and the inward stroke forces the oil through outlet valve 86.

Figures 7, 8, 9:
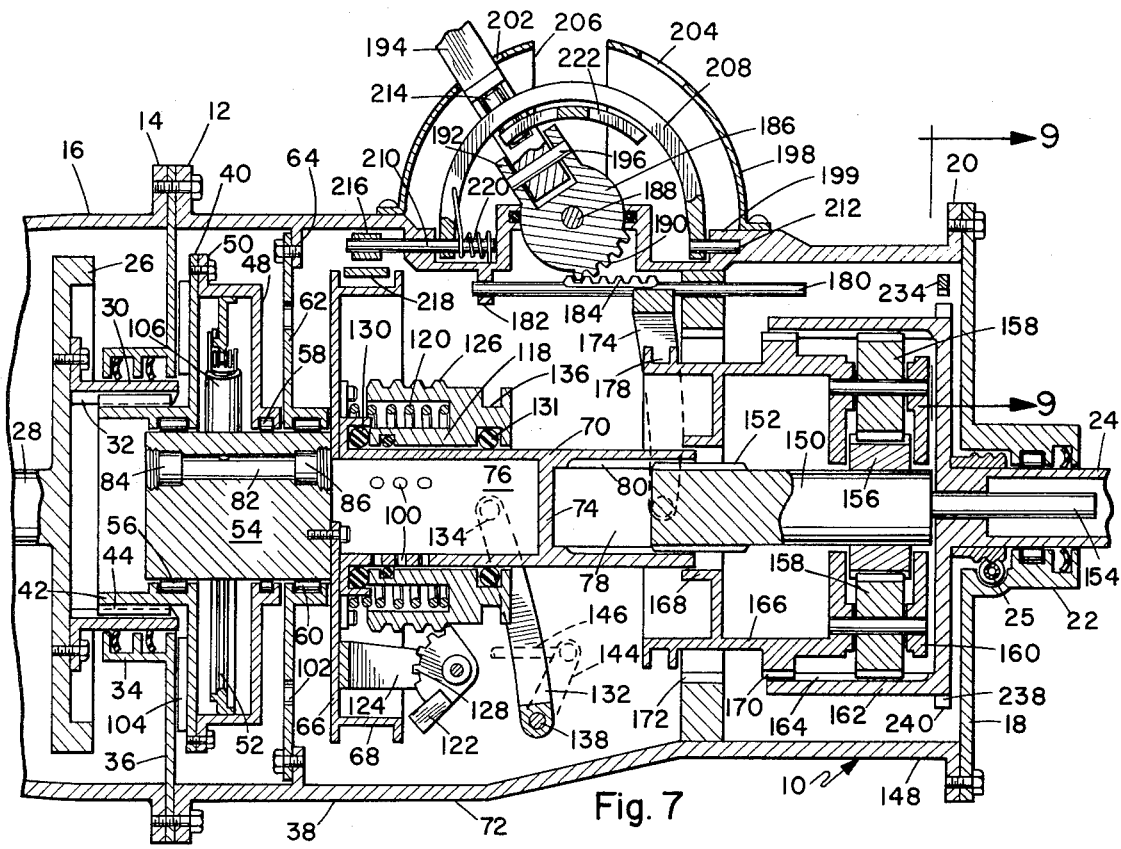
FIG. 7 is a view similar to FIG. 1, but showing the drive coupling locked and the gears engaged in forward drive position.
FIG. 8 is a partial top plan view of the transmission.
FIG. 9 is a sectional view taken on line 9—9 of FIG. 7, with associated mechanism indicated in broken line.

Slidably mounted on coupling shaft 70 is a sleeve valve 118 which, in a forward position, covers and seals ports 100, but is normally biased rearwardly by a spring 120. The sleeve valve is actuated by a governor mechanism, comprising flyweights 122 pivotally mounted on brackets 124 extending rearwardly from brake drum 66. Sleeve valve 118 has spaced annular teeth 126 and each flyweight 122 has a gear segment 128 which engages the annular teeth, so that outward motion of the flyweights pulls the sleeve valve forward. In the closed position the forward end of the sleeve valve closes against a seal ring 130 fitted around the forward end of coupling shaft 70, as in FIG. 7. An internal seal ring 131 in the rear portion of the sleeve valve seals against the coupling shaft as the sleeve valves slides. To assist the governor action, the flyweights are positioned radially outwardly from ports 100, so that the ejected oil strikes the flyweights. For some purposes it may be desirable to close the sleeve valve before the governor takes effect. This is accomplished by means of a fork 132 having rollers 134 riding in an annular channel 136 in the rear portion of sleeve valve 118. The fork 132 is pivotally mounted on a rocker shaft 138 extending across the housing and journalled in bearings 140 and 142. One end of rocker shaft 138 projects from the housing and has an arm 144 fixed thereon, with a push-pull rod 146 extending from the arm for connection to a suitable hand or foot control.

In the rear portion 148 of housing 10 is a generally conventional planetary gear assembly for forward or reverse drive. The assembly includes a gear shaft 150 having an externally splined forward end 152 which slides in the splined rear chamber 78 of coupling shaft 70. The rear end of gear shaft 150 is supported by a stub shaft 154 axially slidable in output shaft 24. Fixed on gear shaft 150 is a sun gear 156 meshed with a set of planetary gears 158 mounted in a cage 160, the planetary gears riding in a ring gear 162 with internal spline-like teeth 164. The cage 160 has a forwardly extended barrel portion 166, with a central hub 168 which slides over coupling shaft 70 for axially alignment. On the outside of barrel portion 166 is an external spline ring 170 which meshes with ring gear teeth 164 in a rearwardly displaced position for forward drive. When the cage is moved forwardly the spline ring 170 locks into an internal spline ring 172 fixed in the housing 10, to provide a reverse drive coupling. In neutral, as shown in FIG. 1, the spline ring 170 is free between ring gear 162 and spline ring 172.

Shifting is accomplished by means of a fork 174 having rollers 176 which ride in an annular channel 178 on the forward end barrel portion 166. The fork 174 is fixed to a slide bar 180 axially slidably mounted in the spline ring 172 and a forward bearing lug 182, the top of the bar having a toothed rack 184. In the top of central housing portion 72 is a shift block 186 pivotally mounted on a transverse pin 188 to swing from front to rear, the shift block having a lower gear segment 190 which meshes with rack 184. The upper portion of shift lock 186 has a clevis 192 in which the shift lever 194 is pivotally held by a hinge pin 196 to swing from side to side.

The shift mechanism is enclosed by a cover 198 secured to a platform portion 199 on top of housing 10, the cover having a longitudinal slot 200 in which the shift lever travels from front to rear. At the forward end of slot 200 is a laterally offset notch 202 and at the rear is a similarly offset notch 204, in which the shift lever is held in the forward and reverse positions, respectively. At the center of slot 200 is a transverse slot 206, on the same side as the offset of notches 202 and 204 and extending down the side of cover 198, so that the shift lever 194 can swing down to a substantially horizontal position, as shown in broken line in FIG. 6.

The brake drum 66 is used to retard the rotating components while shifting between forward and reverse. Within cover 198 is a brake bar 208 of arcuate configuration, pivotally mounted on platform portion 199 by hinge pins 210 and 212 to swing laterally. Brake bar 208 is offset to the side of shift lever 194 opposite to the slot 206, the shift lever having a recessed roller 214 which rides on the brake bar. The forward hinge pin 210 extends into the housing and carries an arm 216, on which is a brake shoe 218 shaped to ride in channel 68. A torsion spring 220 biases the brake bar 208 toward the shift lever 194 and to the disengaged position of the brake shoe. Slot 200 is offset from the center line so that the shift lever must be pushed slightly to one side, toward the driver, to ride in the slot. This swings the brake bar 208 to the side and presses brake shoe 218 into channel 68 to retard the brake drum 66. At either the forward or reverse positions, the shift lever is biased into the respective notch 202 or 204 by the brake releasing spring 220.

To provide security when the vehicle is not in use, a lock is incorporated in the transmission. Immediately below the brake bar 208 is an arcuate lock bar 222 on which roller 214 also rides. Lock bar 222 is attached to a bellcrank 224 hinged on cover 198, a rod 226 extending from the bellcrank into housing 10 and being connected to an arm 228 fixed to a lock shaft 230. The lock shaft is journalled in spline ring 172 and in a bearing lug 232 in the rear housing portion 148. On the rear end of lock shaft 230 is a pawl 234 having a prong 236 which engages in any one of the circumferentially spaced notches 238 in the rim 240 on the rear of ring gear 162. The pawl 234 is held in the unlocked position, shown in full line in FIG. 9, by the shift lever 194 bearing against lock bar 222. When the shift lever is folded in the neutral position, a torsion spring 242 urges the pawl into locked position, shown in broken line in FIG. 9, the bellcrank linkage being indicated for reference.

In operation, the input shaft 28 drives the cam disc 48 through the splined connection, the rotation of the eccentric cam ring 52 actuating pumps 106. The resistance of the oil in being pumped through the valve block 54 and out through ports 100 causes the valve block and coupling shaft 70 to rotate. At low speeds the transmission is thus a fluid drive, with the coupling increasing proportionally with rotational speed. As speed increases, the flyweights 122 swing out, assisted by the oil flow from ports 100, causing the sleeve valve 118 to be pulled forward and close off the ports. The size of ports 100 determines the effective circulation rate of the oil and is set, together with the interior of the flyweights, so that at a predetermined speed, such as a vehicle speed of 20 miles an hour, the sleeve valve 118 is fully closed and the drive coupling is essentially solid. When speed is reduced, the spring 120 opens sleeve valve 118 and the transmission reverts to fluid drive. If full power is needed at low speed, as when towing another vehicle, obtaining engine braking effect downhill, or other such instances, the sleeve valve can be closed manually by actuating fork 132.

When shifting or putting the transmission into gear, with the engine idling, the shift lever 194 is pulled toward the operator and then moved along slot 200 in the required direction. This forces brake bar 208 to the side and applies brake shoe 218 to the brake drum 66, to retard the rotating mechanism and allow the spline ring 170 to slide into engagement with either the ring gear 162 or spline ring 172. When the shift lever is released into either notch 202 or 204, urged by spring 220, the brake is released and drive action commences. In park position, the shift lever is placed in neutral and swung down into slot 206, which causes locking pawl 234 to engage and lock the gears.

In the simple form shown the transmission has a single forward gear ratio and a similar ratio reverse. It will be obvious, however, that the power coupling mechanism is readily adaptable to well known gear arrangements providing a selection of drive ratios.

Having described my invention, I now claim.

1. A transmission for connection to a power unit casing having a power input shaft and a flywheel therein, the transmission comprising:
    a housing having a forward end with means for attachment to the power unit casing, and a closed rear end having an output shaft rotatably mounted therein;
    a coupling shaft connected at the rear end thereof to said output shaft;
    drive means connected to the forward end of said coupling shaft and having means for securement to the flywheel;
    said drive means including a valve block fixed to said coupling shaft;
    an externally splined boss in which said valve block is rotatable;
    an internally splined sleeve fixed to said flywheel and in which said boss is held, the splined connection having open portions defining oil conducting channels;
    at least one pump mounted on said valve block to pump oil therethrough and having an actuating connection to the flywheel;
    and metering means for restricting the flow of oil, thereby causing a driving resistance between the flywheel and coupling shaft.

2. A transmission for connection to a power unit casing having a power input shaft and a flywheel therein, the transmission comprising:
- a housing having a forward end with means for attachment to the power unit casing, and a closed rear end having an output shaft rotatably mounted therein;
- a coupling shaft connected at its rear end to said output shaft and having a hollow chamber in the forward portion thereof;
- drive means connected to the forward end of said coupling shaft and having means for securement to the flywheel;
- said drive means including a valve block fixed to said coupling shaft;
- at least one passage extending substantially axially through said valve block, with an inlet valve at the forward end and an outlet valve at the rear end of said passage opening into said chamber;
- at least one pump mounted on said valve block with a port communicating with said passage between the valves, said pump having an actuating connection to the flywheel;
- said coupling shaft having metering ports opening from said chamber into said housing, for restricting flow of oil therethrough and causing driving resistance between the flywheel and coupling shaft;
- and oil return flow means connecting the interior of said housing to the forward end of said valve block.

3. A transmission according to claim 2, and including a sleeve valve axially slidably mounted over said coupling shaft;
- said sleeve valve being axially biased clear of said metering ports;
- and speed responsive actuating means comprising flyweights mounted radially outwardly from said coupling shaft and connected to said sleeve valve to close the sleeve valve over the metering ports at a predetermined rotational speed.

4. A transmission according to claim 3, wherein said metering ports are radially aligned with said flyweights to direct oil flow against the flyweights.

* * * * *